United States Patent [19]

Burgio di Aragona

[11] Patent Number: 4,763,614

[45] Date of Patent: Aug. 16, 1988

[54] COMPOSITE CAMSHAFT FOR INTERNAL COMBUSTION ENGINES AND A METHOD FOR ITS MANUFACTURE

[75] Inventor: Antonio Burgio di Aragona, Moncalieri, Italy

[73] Assignee: Fiat Auto S.p.A., Turin, Italy

[21] Appl. No.: 13,098

[22] Filed: Feb. 10, 1987

[30] Foreign Application Priority Data

Feb. 14, 1986 [IT] Italy ................. 67108 A/86

[51] Int. Cl.⁴ .............................................. F01L 1/04
[52] U.S. Cl. ........................................ 123/90.6; 74/567
[58] Field of Search ............. 123/192 B, 192 R, 90.6; 74/567, 568 R, 569

[56] References Cited

U.S. PATENT DOCUMENTS 1,580,178  4/1926  Talbot ................................. 74/568

FOREIGN PATENT DOCUMENTS 50355  3/1983  Japan ................................. 74/567
2172088  9/1986  United Kingdom ................. 74/567

Primary Examiner—James C. Yeung
Attorney, Agent, or Firm—Sughrue, Mion, Zinn, Macpeak, and Seas

[57] ABSTRACT

Composite camshaft for internal combustion engines, comprising a support shaft carrying a series of sintered cam members in which through-holes are formed in their lobe parts defining the cam profiles. The shaft is tubular and the cam members are coupled to the shaft by hot driving.

1 Claim, 1 Drawing Sheet

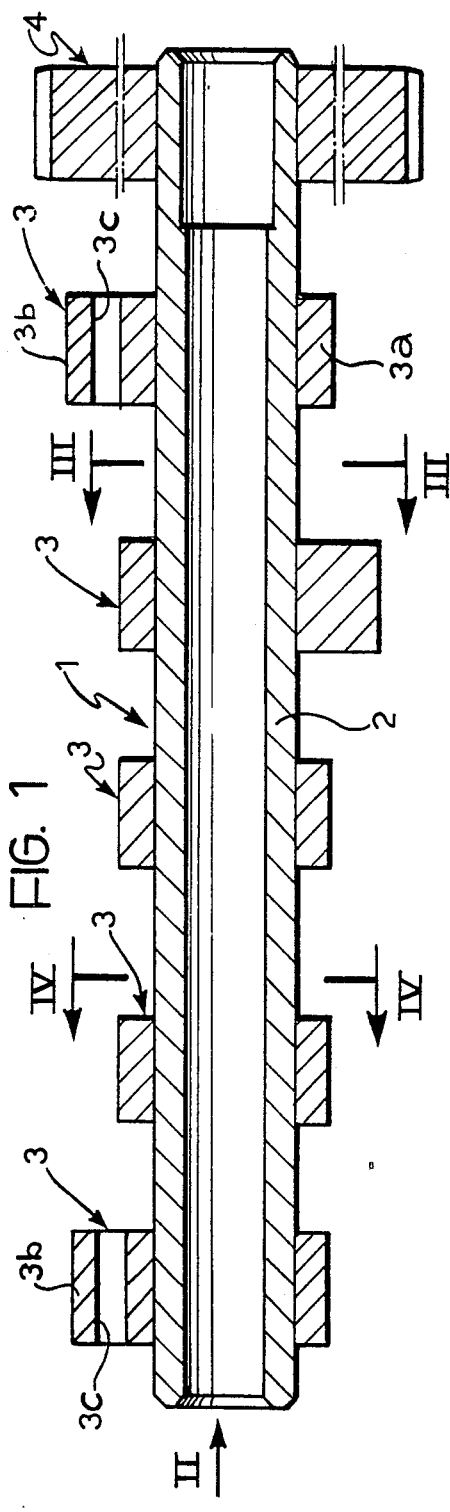
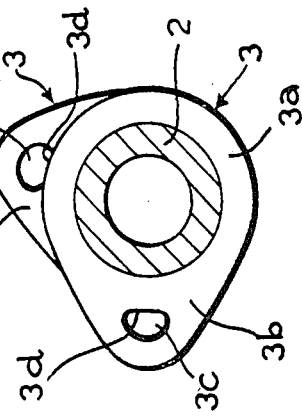
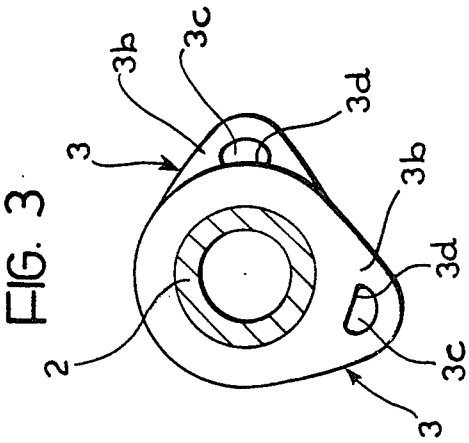
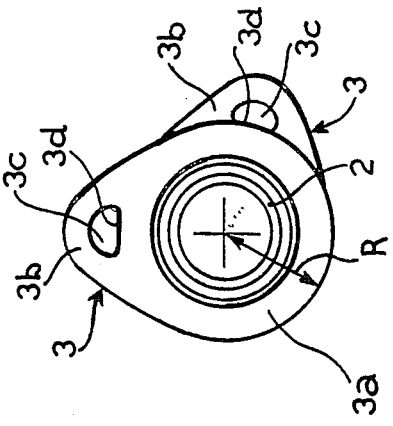

COMPOSITE CAMSHAFT FOR INTERNAL COMBUSTION ENGINES AND A METHOD FOR ITS MANUFACTURE

The present invention relates in general to camshafts for internal combustion engines.

More particularly, the invention concerns a composite camshaft of the type comprising a support shaft carrying a series of sintered cam members, each having an annular part for coupling to the shaft from which extends a lobe part defining the cam profile.

The camshaft according to the invention is characterised in that a through-hole is formed in the lobe part of each cam member and is disposed at a distance from the shaft corresponding substantially to the outer radius of the annular part of the cam member.

By virtue of this characteristic, each cam member has an almost uniform radial thickness around the support shaft, which allows it to be an interference fit on the shaft without the danger that the cam member might break as a result of concentrations of radial stresses.

According to the invention, the support shaft is tubular and the cam members are coupled to the shaft by hot driving, after having been subject to a coining treatment following the sintering.

Thus, the camshaft according to the invention can be manufactured in a relatively simple and cheap manner and, since the correct surface finishing and the required tolerance values for the cam members are obtained as a result of the coining, no supplementary finishing is needed after assembly of the cam members.

The invention will now be described in detail with reference to the appended drawings, provided purely by way of non-limiting example, in which:

FIG. 1 is a schematic, axial-sectional view of a composite camshaft according to the invention, and FIG. 2 is a side elevational view taken on the arrow II of FIG. 1, and FIGS. 3 and 4 are two cross-sectional views taken on the lines III—III and IV—IV of FIG. 1.

In the drawings, a composite camshaft for internal combustion engines for motor vehicles is generally indicated 1. The camshaft 1 is constituted by a support shaft 2 formed from a ground steel tube, and a series of cam members 3 coupled torsionally to the shaft 1 in axially spaced positions. A toothed drive pulley 4 is also keyed to one end of the support shaft 2.

The cam members 3 are formed by hot sintering of metal powders and are subsequently subjected to a coining treatment so as to give the correct surface finish and ensure that the dimensions fall within the designed tolerances. Each cam member 3 has a conventional shape defined by an annular part 3a for coupling to the shaft 2 and a lobe part 3b projecting radially and defining the cam profile.

According to the invention, a through-hole 3c is formed in the lobe part 3b of each cam member 3 and, in the example illustrated, has a profile geometrically similar to that of the lobe part 3. The hole 3c is disposed at a distance from the support shaft 2 corresponding substantially to the outer radius R of the annular part 3a and has a radially inner edge 3d with a shape having a radius of curvature substantially corresponding to the radius R. Thus, each cam member 3 is formed with an almost uniform thickness around the support shaft 2, which avoids dangerous concentrations of radial stresses arising in these members 3 upon coupling to the support shaft 2. In effect, the cam members 3 are formed so as to achieve a certain interference (normally between 4 and 7 hundreths) between the annular part 3a and the support shaft 2, and their coupling to the shaft 2 is achieved by hot driving. The assembly of the camshaft 1 is thus relatively simple and cheap and does not require further grinding or surface finishing.

The drive pulley 4 is also made by sintering and is keyed onto the shaft 2 by hot driving with the use of respective angular references, not illustrated in the drawings. This allows keying errors due to assembly clearances caused by the presence of mechanical coupling members, such as bolts, pins, keys, etc., to be avoided.

Naturally, the details of realisation and forms of embodiment of the invention may be varied widely with respect to that described and illustrated, without thereby departing from the scope of the present invention.

I claim:

1. Composite camshaft for internal combustion engines, comprising a support shaft, a series of sintered cam members each secured to said shaft by an interference fit and having an annular part for coupling to the shaft from which projects a lobe part defining the cam profile, wherein a through-hole is formed in the lobe part of each cam member and is disposed at a distance from the support shaft corresponding substantially to the outer radius of the annular coupling part of the cam member, said through-hole having a profile geometrically similar to that of the lobe part and having a radially inner curved edge with a radius of curvature corresponding substantially to the outer radius of the annular coupling part whereby the cam member is provided with a substantially uniform radial thickness around said support shaft.

* * * * *